2 Sheets—Sheet 1.

G. HAYES.

METALLIC LATHING.

No. 11,448. Reissued Oct. 23, 1894.

Witnesses.

R. H. Reille

Arthur Hayes

Inventor.

Geo Hayes

G. HAYES. 2 Sheets—Sheet 2.

METALLIC LATHING.

No. 11,448. Reissued Oct. 23, 1894.

Witnesses.

R. H. Reille

Arthur Hayes

Inventor.

Geo Hayes

UNITED STATES PATENT OFFICE.

GEORGE HAYES, OF NEW YORK, N. Y.

METALLIC LATHING.

SPECIFICATION forming part of Reissued Letters Patent No. 11,448, dated October 23, 1894.

Original No. 519,952, dated May 15, 1894. Application for reissue filed September 11, 1894. Serial No. 522,761.

*To all whom it may concern:*

Be it known that I, GEORGE HAYES, a citizen of the United States, and a resident of the city, county, and State of New York, have invented a new and useful Metallic Lathing, of which the following is a specification.

My invention relates to those lathings, made from sheets of metal, in which the sheet-metal is corrugated to give strength and rigidity to the lathing when in position, and punctured to form bonds for the plastic material intended to be supported by and incorporated therewith.

The object of the invention is to so improve the construction of the finished lathing sheets that as corrugated, an area of space to be plastered can be covered substantially equivalent to that covered heretofore by a like quantity of flat metal sheathing converted into lathing; thus reducing the cost of metallic lathing and extending its use and availability in the building arts. In effecting this object, I take advantage of the necessity for apertures of substantial width in the lathing sheet, to serve as bonds for the plaster, by adding the aggregated width of those apertures to the original width of the sheet and thus compensating for the loss in width by corrugation. In brief, my finished lathing sheet is one in which the corrugations have been formed expandingly from the slitted sheet of flat metal, and my completed bonding apertures are formed not by cutting wide pieces out of the sheet, but by slitting the sheet longitudinally at intervals over its surface and then by the process of corrugating forming the sheet into ridges and hollows, whereby the slits are widened, or expanded into apertures of the desired width and by such expansion of the slits allowing for the corrugations, whereby any contraction of the sheet in width is avoided. In doing this I ascertain by calculation how much of the width of my sheet blank will be lost by the intended corrugation of the sheet—a matter that depends upon the number and height, or depth, of the longitudinal corrugations in a sheet blank of given width—and then I determine how many longitudinal slits to form in the sheet, and what their length shall each be, to permit of an expansion sufficient to overcome the loss by corrugation.

Figure 1:
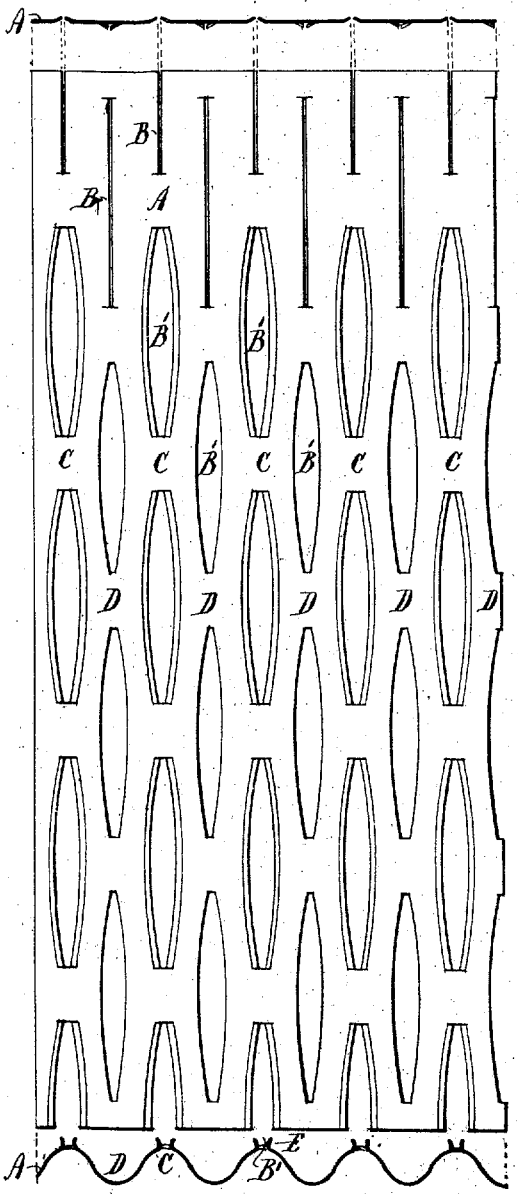
Figure 2:
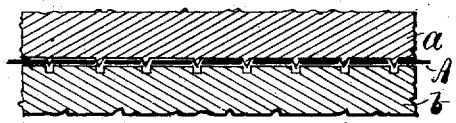
Figure 3:
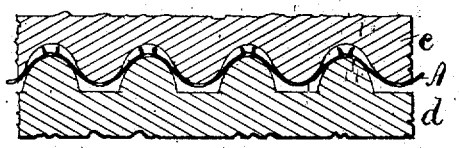
Figure 4:
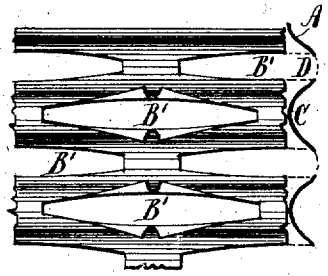
Figure 5:
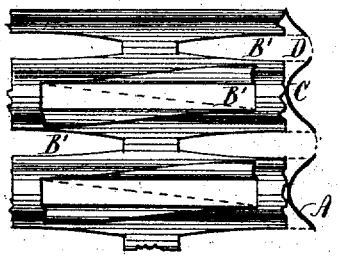
Figure 6:
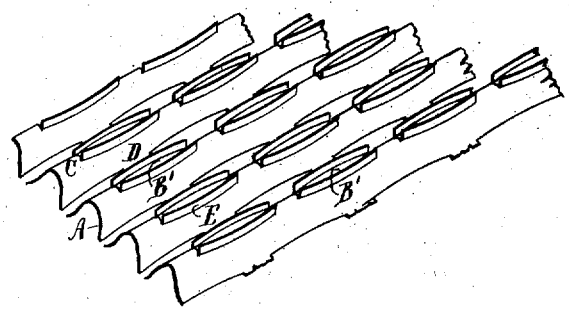
Figure 7:
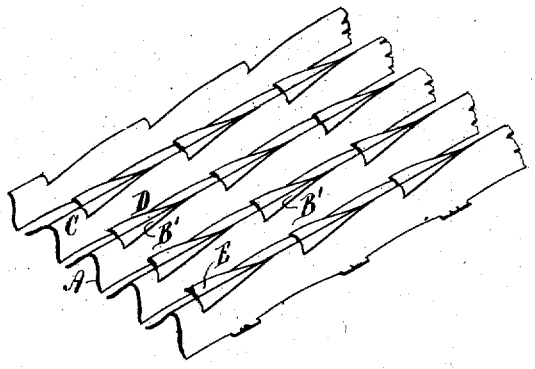

In the accompanying drawings Figure 1.—is a face view of a sheet of my lathing, illustrating stages in the manufacture; having, at the top of the figure, a disconnected section view, additionally illustrating the first stage of manufacture, comprising the puncturing, or slitting, as indicated in the upper part of the main view, and, at the bottom, a disconnected section view, additionally illustrating the advanced, or second, stage of manufacture, the sheet corrugated and slits expanded—as indicated in the lower part of the main view. Fig. 2,—is a section view, showing the manner of slitting the metal sheet at intervals, by a series of cutting dies. Fig. 3,—is a section view, showing the formation of ridges in the metal sheet by means of pressure dies. Figs. 4, and 5,—are face views, showing various modes of treating the apertures made in the sheet, to adapt apertures and their edge-metal to the keying and bonding of plaster. Fig. 6,—is a perspective view of the sheet shown in Fig. 1.—formed into a finished lathing, and Fig. 7, is a modification showing another way of treating the edge-metal of the apertures.

On the drawings A, is the sheet of metal to be formed into a metallic lathing. B, indicates slits made in said sheet. B′, indicates said slits expanded into wide apertures.

C, indicates the ridges formed into the sheet and D, the depressions produced in the sheet by the process of ridging it.

E, indicates the lips or tongues that I may choose to form from the edge-metal of the expanded apertures.

The letter *a*, indicates the upper, and *b*, the lower, of the series of cutting dies by which the metal sheet is to be punctured, or slitted, while *c*, indicates the upper and *d*, the lower of the pressure dies for ridging said sheet, it being preferable that the slitting and ridging of the sheet should be performed by machine action, though they can be performed manually with tools, when time and expense are not a controlling factor.

In carrying out my invention, I take a blank, metal sheet, rectangular in form and of standard size, and (preferably by means of cutting dies) form therein, at intervals, which are regular up and down, as well as across the sheet, long, narrow slits, as shown in the upper part of Fig. 1 of the drawings. The intervals are so laid out on the sheet as that alternate, longitudinal rows of slits "break joint" with the adjacent rows. Between the approximate terminals of every two slits in a row, a web of metal is left, and this web comes opposite the middle of the adjacent slits on either side of the web. The metal sheet being now slitted on a definite and regular plan, it enters between a pair of rolls or dies, as indicated in Fig. 3 of the drawings. The conformation of the faces of this pair of rolls or dies is such that at regular intervals, crosswise the sheet, they hold the sheet against lateral movement, while pressing out of plane those longitudinal sections of it that are designed to be formed into the ridges C, and the depressions D, already mentioned. At the same time the pressure exerted by these specially formed coacting rolls or dies opens out the long narrow slits into wide apertures, as appear in the lower part of Fig. 1 of the drawings, and so adapts the slits for the holding of plaster. It will be seen in Fig. 3 that the face of one die does not conform strictly to the face of the other, and this intentional variation gives the needed room and opportunity for a local movement of the metal web, as the slits expand, except at those places, or along those longitudinal sections, that are tightly held by the rolls, or dies. Usually, the holding points, or places would be along the lines of the ridges C, yet, in a variation of the finished surface of the lathing sheet, they might come elsewhere; but they will always be at prescribed and regular intervals over the face of the sheet.

By the described method of design and execution, a sheet-metal lathing can be produced; efficient, sightly and regular.

While the foregoing is a sufficient indication and description to sheet-metal workers of how to produce the expandingly corrugated lathing sheet constituting my invention, the production may be effected in other ways, manually and mechanically; it being only necessary to slit the sheet blank in such a manner longitudinally, as to provide for the desired number and distribution of apertures needed for bonds, or keys, for plaster, and then to expand the slits into apertures of such width as will not only serve their office, but will compensate for the metal taken out of plane by the ridging of the sheet. The crinkling of the face of the sheet, in corrugating it, will not in the least lessen the lengthwise dimension of the finished lathing, for the length of each slit to be subjected to lateral expansion is too insignificant by comparison with the outline of the sheet to have a contracting effect upon the length of the sheet, and there is enough local movement in the web of metal around each slit to accommodate the sheet to the expanding process without drawing it up lengthwise. As to its width, that can be regulated, so as to be of exactly the same measurement, or approximating that of the original, flat, blank sheet; and in any case the width will be uniform along the whole sheet of lathing, and the edges straight, while at the same time the original thickness of the sheet metal will be unaffected.

In slitting the sheet of metal I sometimes use dies which will widen such of the slits as may be desirable, by rolling backwardly, or turning outwardly edge-metal of the desired slits to one or both of the longitudinal sides of the opening so that each of the apertures so treated is in effect a slot, the edge-metal being left integral with the sheet as lips, tongues, hooks, or barbs, which embedded in the plaster will serve as clinches auxilliary to the openings in securing the plastic composition to the lathing sheet. Apertures so formed are specially shown in Figs. 4, 5, and 7, of the drawings.

I am aware that ridged and apertured sheet-metal lathing, contracted in width by ridging is common; also that it is common to expand apertures in sheet-metal by stretching; likewise, that it is not new to produce metal sheets with expanded slits and with ridges, transverse to the same; also, that sheet-metal lathing has been used, in which are depressions attached to joists, or studding, and apertures on the flat, elevated part of the sheet, widened after such attachment. I claim none of those methods or constructions. I ridge, or ridge and depress my sheet from its original plane without contraction of its width, when I so desire, and, having regularly slitted my sheet blank, I contrive, by specially formed and adapted pressure dies, in and by a single operation, or by any other suitable and preferred method to produce a ridged and apertured sheet of practicable lathing, with which, when I choose, I can practically and effectually cover an area of wall or ceiling space as large as the sheet blank would have covered in its original state.

What I claim as my invention is—

1. A corrugated, slitted sheet of metal lathing, in which the corrugations are allowed for by the lateral expansion of the slits, substantially as and for the purpose described.

2. A corrugated, slitted sheet of metal lathing, having apertures therein, the edge-metal of which turned outwardly, but not removed from the sheet, remains as lips, tongues, hooks or barbs, and the corrugations allowed for by lateral expansion of the openings as set forth.

3. A corrugated slitted sheet of metal lathing in which the corrugations are projected beyond the plane of the sheet by lateral expansion of the slits and the entire corrugation of the sheet allowed for by such expansion of the openings as set forth.

GEO. HAYES.

Witnesses:
R. H. REILLE,
ARTHUR HAYES.